(12) United States Patent
Honda et al.

(10) Patent No.: US 8,895,947 B2
(45) Date of Patent: *Nov. 25, 2014

(54) ULTRAVIOLET LIGHT GENERATING TARGET, ELECTRON-BEAM-EXCITED ULTRAVIOLET LIGHT SOURCE, AND METHOD FOR PRODUCING ULTRAVIOLET LIGHT GENERATING TARGET

(75) Inventors: Yoshinori Honda, Hamamatsu (JP); Fumitsugu Fukuyo, Hamamatsu (JP); Takashi Suzuki, Hamamatsu (JP); Norio Ichikawa, Hamamatsu (JP); Takeaki Hattori, Hamamatsu (JP); Koji Kawai, Hamamatsu (JP); Shucheng Chu, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/113,398

(22) PCT Filed: Apr. 24, 2012

(86) PCT No.: PCT/JP2012/060975
§ 371 (c)(1),
(2), (4) Date: Oct. 23, 2013

(87) PCT Pub. No.: WO2012/147743
PCT Pub. Date: Nov. 1, 2012

(65) Prior Publication Data
US 2014/0034853 A1 Feb. 6, 2014

(30) Foreign Application Priority Data

Apr. 25, 2011 (JP) ................. 2011-097260

(51) Int. Cl.
*H01J 63/06* (2006.01)
*G01N 21/53* (2006.01)
*F21K 2/00* (2006.01)
*C09K 11/77* (2006.01)
*H01J 63/04* (2006.01)

(52) U.S. Cl.
CPC ............... *F21K 2/00* (2013.01); *C09K 11/7766* (2013.01); *H01J 63/06* (2013.01); *H01J 63/04* (2013.01)
USPC .................... 250/504 R; 250/365; 250/458.1; 250/461.1

(58) Field of Classification Search
CPC .. H01L 21/268; G01N 21/33; G01N 21/8422; G01N 33/5438
USPC .......................... 250/504 R, 365, 461.1, 458.1
See application file for complete search history.

(56) References Cited

U.S. PATENT DOCUMENTS

| 5,573,891 | A | * | 11/1996 | Sato et al. ............ 430/323 |
| 7,405,033 | B2 | * | 7/2008 | Yamazaki et al. ...... 430/311 |
| 2014/0048721 | A1 | * | 2/2014 | Honda et al. ........... 250/458.1 |

FOREIGN PATENT DOCUMENTS

| CN | 1547627 | 11/2004 |
| CN | 1837142 | 9/2006 |

(Continued)

OTHER PUBLICATIONS

J. Plewa, et al., "On the Luminescence of $Lu_{3-x}Pr_xAl_5O_{12}$ Ceramic Bodies", Materialy Ceramiczne/Ceramic Materials/, vol. 60, No. 4, 2008, pp. 229-233.

(Continued)

*Primary Examiner* — Nikita Wells
(74) *Attorney, Agent, or Firm* — Drinker Biddle & Reath LLP

(57) ABSTRACT

An ultraviolet light generating target 20 includes a substrate 21 made of sapphire, quartz or rock crystal; and a Pr:LuAG polycrystalline film 22, provided on the substrate 21, that generates ultraviolet light upon receiving an electron beam. By using a Pr:LuAG polycrystal as the target, the ultraviolet light generating efficiency can be increased more remarkably than when a Pr:LuAG single crystal film is used.

6 Claims, 15 Drawing Sheets

(56) References Cited

FOREIGN PATENT DOCUMENTS

| | | |
|---|---|---|
| EP | 1 873 226 | 1/2008 |
| EP | 2 128 222 | 12/2009 |
| JP | 2006-520836 A | 9/2006 |
| JP | 2006-335915 A | 12/2006 |
| JP | 2007-294698 A | 11/2007 |
| JP | 2008-024549 | 2/2008 |
| JP | 2009-227794 A | 10/2009 |
| JP | 2009-238415 A | 10/2009 |
| JP | 2009-256596 | 11/2009 |
| JP | 2010-100694 | 5/2010 |
| JP | 2010-235388 A | 10/2010 |
| WO | WO 2006/016711 | 2/2006 |
| WO | WO-2006/049284 A1 | 5/2006 |
| WO | WO 2007/116331 | 10/2007 |
| WO | WO-2009/031584 A1 | 3/2009 |
| WO | WO-2010/097731 A1 | 9/2010 |

OTHER PUBLICATIONS

Yuriy Zorenko, et al., "LuAG:Pr, LuAG:La and LuAP:Ce Thin Film Scintillators for Viusalisation of X-ray Images," Proceedings of SPIE, vol. 7310, Apr. 30, 2009, pp. 731007-731007-8.

* cited by examiner (a)

(b)

ULTRAVIOLET LIGHT GENERATING TARGET, ELECTRON-BEAM-EXCITED ULTRAVIOLET LIGHT SOURCE, AND METHOD FOR PRODUCING ULTRAVIOLET LIGHT GENERATING TARGET

TECHNICAL FIELD

The present invention relates to an ultraviolet light generating target, an electron-beam-excited ultraviolet light source, and a method for producing the ultraviolet light generating target.

BACKGROUND ART

Patent Literature 1 describes the use of a single crystal containing praseodymium (Pr) as a material of a scintillator used in a PET apparatus. Furthermore, Patent Literature 2 describes a technique relating to an illumination system for achieving white light by converting the wavelength of the light emitted from a light emitting diode by using a fluorescent material.

CITATION LIST

Patent Literature

Patent Literature 1: WO2006/049284
Patent Literature 2: Japanese Translation of International Application Publication No. 2006-520836

SUMMARY OF INVENTION

Technical Problem

Conventionally, electron tubes such as mercury-xenon lamps and heavy hydrogen lamps have been used as an ultraviolet light source. However, these ultraviolet light sources have a low luminous efficiency and are large in size, and at the same time, there are issues from the viewpoint of stability and service life. On the other hand, as another ultraviolet light source, there is available an electron-beam-excited ultraviolet light source having a structure in which ultraviolet light is excited by irradiating a target with an electron beam. The electron-beam-excited ultraviolet light sources are expected to be used in the optical measurement field by taking advantage of the high stability, and used for sterilization and disinfection purposes by taking advantage of the low power consumption, or used as a light source in medical treatment and bio-chemistry using high wavelength selectivity. Furthermore, another advantage of the electron-beam-excited ultraviolet light source is lower power consumption than a mercury lamp, or the like.

Furthermore, in recent years, a light emitting diode that can output light in the ultraviolet region, that is, light having a wavelength of 360 nm or less, has been developed. However, a problem arises that the intensity of the light output from such a light emitting diode is still small, and increasing the area of the light-emitting surface is difficult with a light emitting diode, and therefore, the usage becomes limited. In contrast, the electron-beam-excited ultraviolet light source can generate ultraviolet light of sufficient intensity, and furthermore, by increasing the diameter of the electron beam with which the target is irradiated, ultraviolet light having a uniform intensity can be output across a large area.

However, even in the electron-beam-excited ultraviolet light source, a further improvement in the ultraviolet light generating efficiency is required. An object of the present invention is to provide an ultraviolet light generating target, an electron-beam-excited ultraviolet light source, and a method for producing the ultraviolet light generating target, with which it is possible to improve the ultraviolet light generating efficiency.

Solution to Problem

In view of the above-described problems, the present inventor thought of using $(Pr_xLu_{1-x})_3Al_5O_{12}$ (Pr:LuAG Praseodymium doped lutetium aluminum garnet, where the range of x is 0<x<1) as the ultraviolet light generating target. However, it was found that when a Pr:LuAG single crystal such as that described in the prior art literature is used, it is difficult to achieve sufficient ultraviolet light generating efficiency. Another problem was that due to the high price of the Pr:LuAG single crystals, the cost of producing an ultraviolet light generating target increases. In contrast, as a result of tests and research by the present inventor, it was found out that by using a Pr:LuAG polycrystal as the target, the ultraviolet light generating efficiency could be increased more remarkably than when a Pr:LuAG single crystal was used. That is, based on the ultraviolet light generating target according to an embodiment, the ultraviolet light generating efficiency can be improved by including a substrate made of sapphire, quartz or rock crystal (crystals of silicon oxide), and a Pr:LuAG polycrystalline film that is provided on the substrate and that generates ultraviolet light upon receiving an electron beam.

In the ultraviolet light generating target, the thickness of the Pr:LuAG polycrystalline film may be 0.1 μm or more and 10 μm or less. According to tests and research by the present inventor, the required thickness of the Pr:LuAG polycrystalline film is at least 0.1 μm or more in order to contribute to light emission without allowing the electron beam to pass therethrough, and preferably 10 μm or less from the viewpoint of productivity. In a Pr:LuAG polycrystalline film having such a thickness, the ultraviolet light generating efficiency can be increased more effectively.

In the electron-beam-excited ultraviolet light source according to one embodiment, the electron-beam-excited ultraviolet light source includes any of the above ultraviolet light generating targets, and an electron source that provides an electron beam to the ultraviolet light generating target. According to the present electron-beam-excited ultraviolet light source, by including any of the above ultraviolet light generating targets, the ultraviolet light generating efficiency can be improved.

A method for producing the ultraviolet light generating target according to one embodiment of the present invention includes a first step of depositing a Pr:LuAG film on a substrate made of sapphire, quartz or rock crystal; and a second step of performing polycrystallization through a heat treatment of the Pr:LuAG film. In the first step, an amorphous Pr:LuAG film is formed on the substrate made of sapphire, quartz or rock crystal. However, in the amorphous Pr:LuAG film, the ultraviolet light is hardly excited even upon irradiation with an electron beam. As in this production method, by performing heat treatment (annealing) on the Pr:LuAG film in the second step, the amorphous Pr:LuAG film can be polycrystallized. That is, according to this production method, an ultraviolet light generating target having a Pr:LuAG polycrystalline film can be produced favorably. The first step and the second step can be performed simultaneously.

In the method for producing the ultraviolet light generating target, the thickness of the Pr:LuAG film after the heat treatment in the second step may be 0.1 μm or more and 10 μm or less. Accordingly, the ultraviolet light generating efficiency can be improved more effectively.

In the method for producing the ultraviolet light generating target, during the heat treatment in the second step, the surrounding of the Pr:LuAG film may be a vacuum. Accordingly, the ultraviolet light generating efficiency can be improved more effectively.

Advantageous Effects of Invention

According to the ultraviolet light generating target, the electron-beam-excited ultraviolet light source, and the method for producing ultraviolet light generating target of the present invention, the ultraviolet light generating efficiency can be improved.

DESCRIPTION OF EMBODIMENTS

Hereinafter, an embodiment of an ultraviolet light generating target, an electron-beam-excited ultraviolet light source, and a method for producing the ultraviolet light generating target according to the present invention are explained in detail with reference to the attached drawings. Note that in the description of drawings, the same reference sign is given to the same element, and duplicate explanations are omitted.

Figure 1:
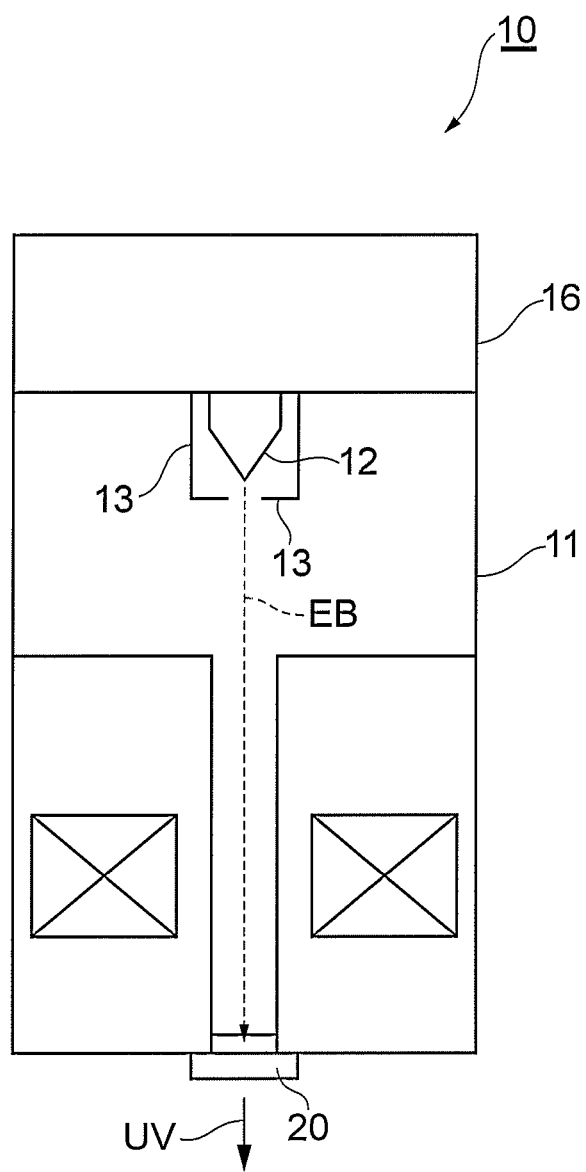
FIG. 1 is a schematic diagram illustrating an internal configuration of an electron-beam-excited ultraviolet light source according to an embodiment.

FIG. 1 is a schematic diagram illustrating an internal configuration of an electron-beam-excited ultraviolet light source 10 according to the present embodiment. As illustrated in FIG. 1, in the present electron-beam-excited ultraviolet light source 10, an electron source 12 and an extraction electrode 13 are arranged at the upper end side inside the vacuum-pumped glass container (electron tube) 11. Then, when an appropriate extraction voltage is applied from a power supply unit 16 between the electron source 12 and the extraction electrode 13, an electron beam EB that is accelerated by a high voltage is emitted from the electron source 12. An electron source (for example, a cold cathode such as carbon nanotubes, or a hot cathode) that emits an electron beam having a large area, for example, can be used as the electron source 12.

An ultraviolet light generating target 20 is arranged at the lower end side inside the container 11. The ultraviolet light generating target 20, for example, is set to the ground potential, and a high negative voltage is applied from the power supply unit 16 to the electron source 12. Accordingly, the electron beam EB emitted from the electron source 12 enters, with irradiation, the ultraviolet light generating target 20. The ultraviolet light generating target 20 is excited upon receiving the electron beam EB and generates ultraviolet light UV.

Figure 2:
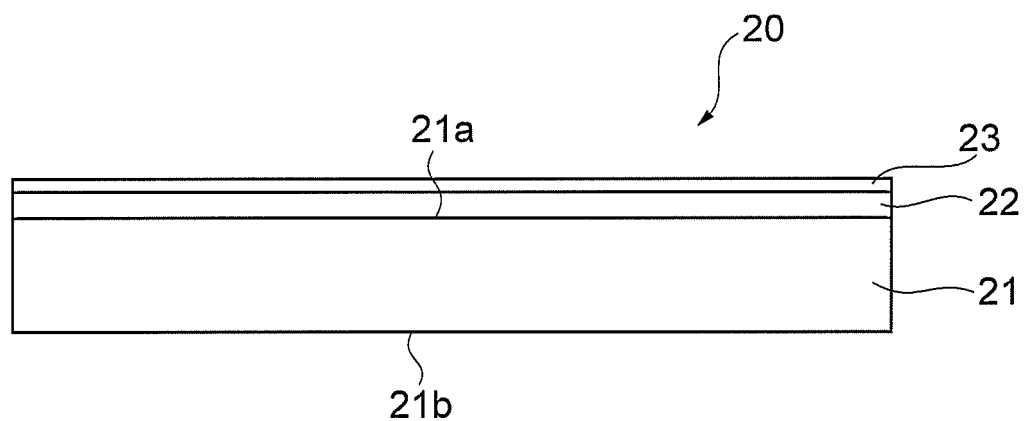
FIG. 2 is a side view illustrating a configuration of an ultraviolet light generating target.

FIG. 2 is a side view illustrating a configuration of the ultraviolet light generating target 20. As illustrated in FIG. 2, the ultraviolet light generating target 20 includes a substrate 21, a Pr:LuAG polycrystalline film 22 provided on the substrate 21, and an aluminum film 23. The substrate 21 is a plate-like member made of sapphire ($Al_2O_3$), quartz ($SiO_2$) or rock crystal, and has a main surface 21a and a back surface 21b. A favorable thickness of the substrate 21 is 0.1 mm or more and 10 mm or less.

The Pr:LuAG polycrystalline film 22 is a film made of polycrystallized Pr:LuAG. The Pr:LuAG polycrystalline film 22 is excited upon receiving the electron beam EB shown in FIG. 1 and generates the ultraviolet light UV. As can be seen from the examples described later, the favorable thickness of Pr:LuAG polycrystalline film 22 is 0.1 μm or more and 10 μm or less. A favorable Pr concentration of the Pr:LuAG polycrystalline film 22 is 0.001 atom % or more and 10 atom % or less.

Figure 3:
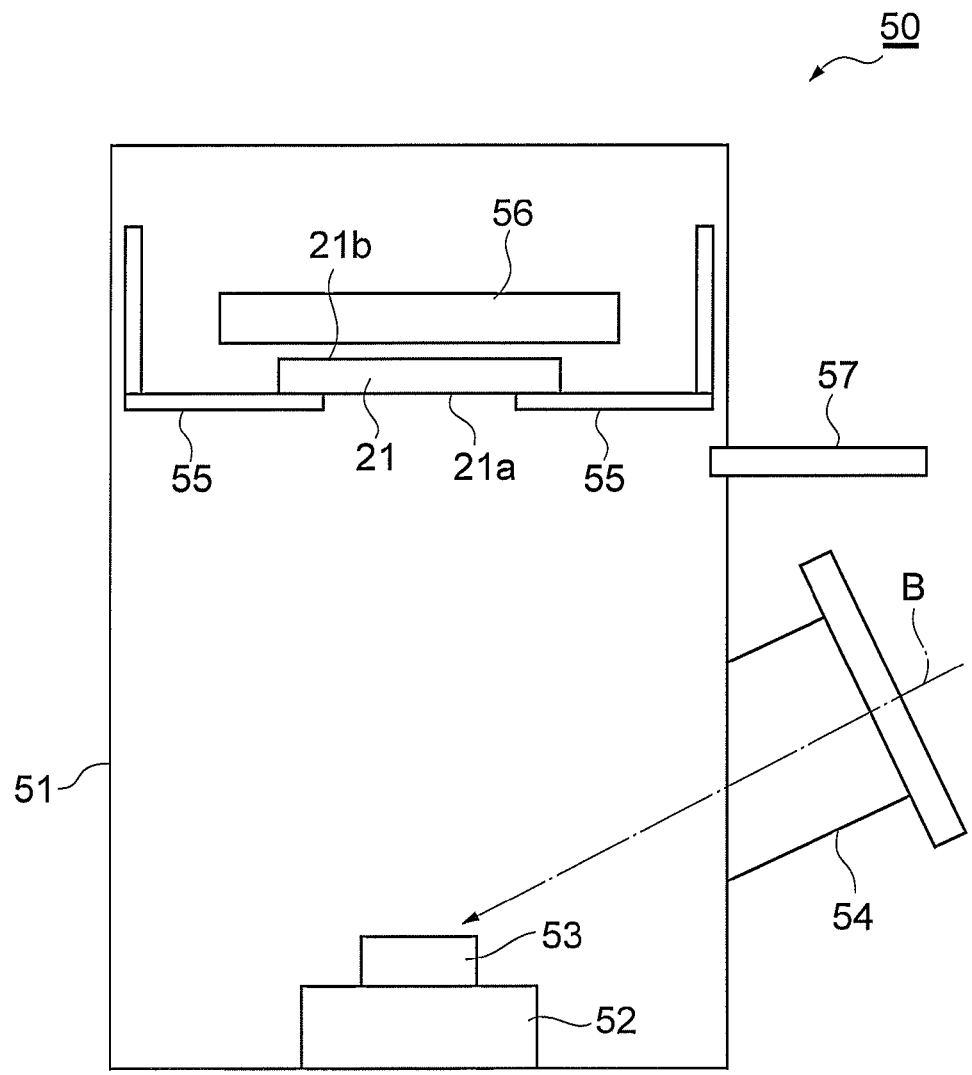
FIG. 3 is a schematic diagram illustrating a configuration of a laser ablation apparatus used in this production method.

Next, a method for producing the ultraviolet light generating target 20 of the present embodiment will be described. FIG. 3 is a schematic diagram illustrating a configuration of a laser ablation apparatus 50 used in this production method. The laser ablation apparatus 50 illustrated in FIG. 3 includes a vacuum container 51, a sample loading table 52 arranged on the bottom surface of the vacuum container 51, and a laser inlet 54. The laser inlet 54 introduces a laser beam B that enters, with irradiation, a Pr:LuAG-containing material 53, into the vacuum container 51. The Pr:LuAG-containing material 53 is a sample to be loaded on the sample loading table 52. The laser beam (wavelength 248 nm) from a KrF excimer laser, for example, is provided to the laser inlet 54.

In addition, the laser ablation apparatus 50 includes a rotating holder 55, a heater 56 for heating the substrate 21, and a gas inlet 57 for supplying oxygen gas into the vacuum container 51. The rotating holder 55 supports the substrate 21 arranged above the Pr:LuAG-containing material 53. In a state where the main surface 21a of the substrate 21 is exposed to face the Pr:LuAG-containing material 53, the rotating holder 55 holds the substrate 21 so as to be rotatable about an axis connecting the Pr:LuAG-containing material 53 and the substrate 21.

Figure 4:
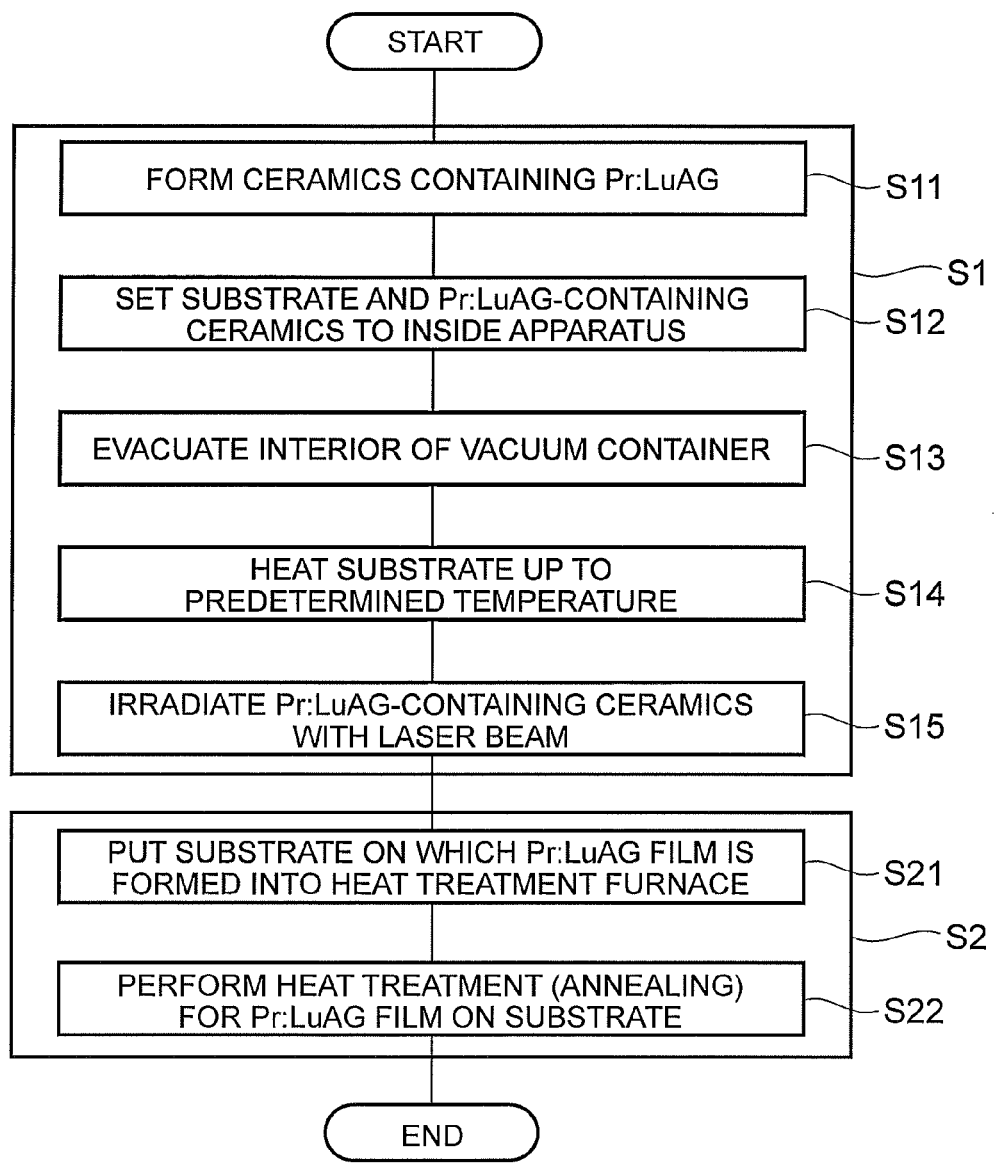
FIG. 4 is a flowchart illustrating a method for producing the ultraviolet light generating target.

FIG. 4 is a flowchart illustrating a method for producing the ultraviolet light generating target 20. First of all, the Pr:LuAG film is deposited on the substrate 21 (first step S1). Specifically, at first, a ceramics containing Pr:LuAG in a predetermined ratio is formed as the Pr:LuAG-containing material 53 (step S11). Next, the substrate 21 made of sapphire, quartz or rock crystal is prepared, and the substrate 21 is set on the rotating holder 55 of the laser ablation apparatus 50, and at the same time, the Pr:LuAG-containing material 53 formed in step S11 is loaded on the sample loading table 52 (step S12). Then, the interior of the vacuum container 51 is evacuated (step S13), and the substrate 21 is heated up to a predetermined temperature (for example, 800° C.) by the heater 56 (step S14). Thereafter, the Pr:LuAG-containing material 53 is irradiated with the laser beam B while supplying oxygen gas into the vacuum container 51 from the gas inlet 57 (step S15). Accordingly, the Pr:LuAG-containing material 53 evaporates upon receiving the laser beam B, and scatters inside the vacuum container 51. Some of the scattered Pr:LuAG-containing material 53 adheres to the main surface 21a of the substrate 21 and an amorphous film is formed.

Next, heat treatment is performed on the amorphous film that is formed on the main surface 21a of the substrate 21 such that the amorphous film is polycrystallized (the second step S2). Specifically, the substrate 21 on which the amorphous film is formed is removed from the laser ablation apparatus 50 and put into the heat treatment furnace (step S21). The inside of the heat treatment furnace may have an ambient atmosphere containing air, however, more favorably, the inside of the heat treatment furnace is a vacuum. Moreover, by setting the temperature inside the heat treatment furnace to higher than 1200° C., for example, and maintaining the temperature for a predetermined time, heat treatment (annealing) is performed for the amorphous film formed on the substrate 21 (step S22). At this time, the amorphous heat-treated film is polycrystallized to become a Pr:LuAG polycrystalline film.

The effect obtained by the present embodiment will be described. As can be seen from each example described later, by using a Pr:LuAG polycrystal as an ultraviolet light generating target, the ultraviolet light generating efficiency can be improved more remarkably than the case that a Pr:LuAG single crystal is used. The ultraviolet light generating target 20 in the present embodiment includes a Pr:LuAG polycrystalline film 22, and therefore, the ultraviolet light can be generated with high efficiency. Furthermore, because the substrate 21 is made of sapphire, quartz or rock crystal, the amorphous film can be heat-treated at a high temperature in step S22.

In the production method of the present embodiment, after the amorphous film is deposited on the substrate 21, heat treatment is performed for the amorphous film. In the first step S1, the amorphous film is formed on the substrate 21; however, the ultraviolet light is hardly generated even upon the irradiation of the amorphous film with an electron beam. In contrast, by heat-treating the amorphous film in the second step S2, the amorphous film can be polycrystallized, and an ultraviolet light generating target that generates ultraviolet light with a high efficiency can be produced.

First Example

Next, a first example of the above-described embodiment will be described. In the present example, first of all, a ceramics containing 0.8 atom % of Pr was formed as the Pr:LuAG-containing material 53. Next, the Pr:LuAG ceramics was loaded on the sample loading table 52 of the laser ablation apparatus 50, and a sapphire substrate having a diameter of two inches was installed on the rotating holder 55. The distance between the Pr:LuAG ceramics and the sapphire substrate was 150 mm. Then, the interior of the vacuum container 51 was evacuated and the sapphire substrate was heated up to 1000° C. Thereafter, the Pr:LuAG-containing material 53 was irradiated with the laser beam B for 60 minutes while supplying oxygen gas into the vacuum container 51 to form an amorphous film. At this time, a KrF excimer laser (100 mJ, 100 Hz) was used as the laser light source of the laser beam B. Then, the sapphire substrate was put into the heat treatment furnace, and the sapphire substrate and the amorphous film were heated for 2 hours at 1400° C. in the air.

Figure 5:
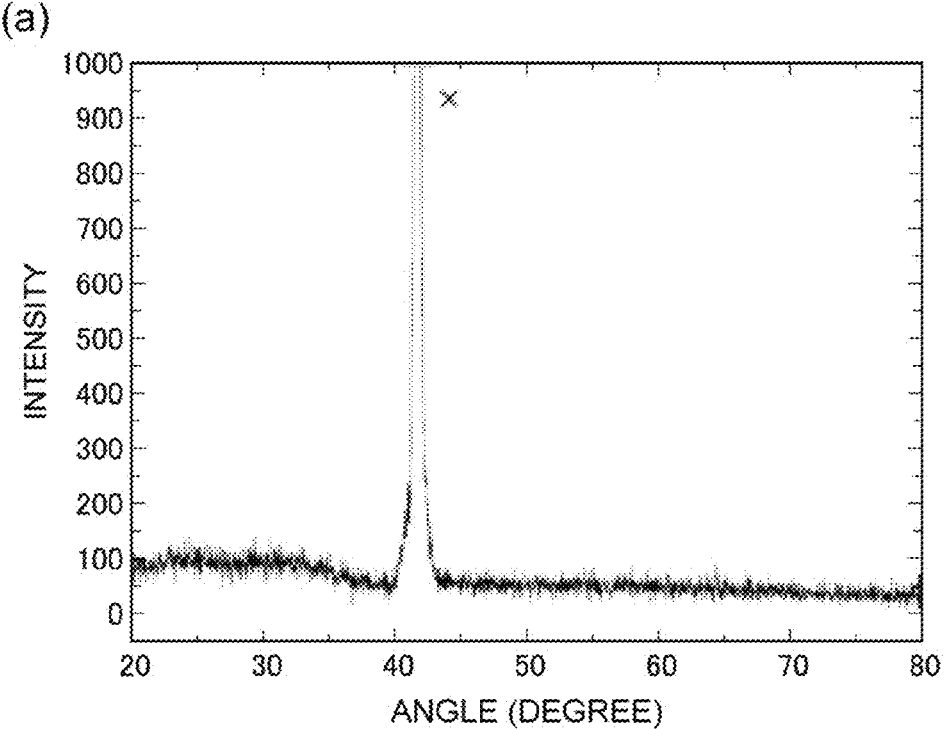
FIG. 5 is a pair of graphs illustrating X-ray diffraction measurement results of a Pr:LuAG film.
Figure 5:
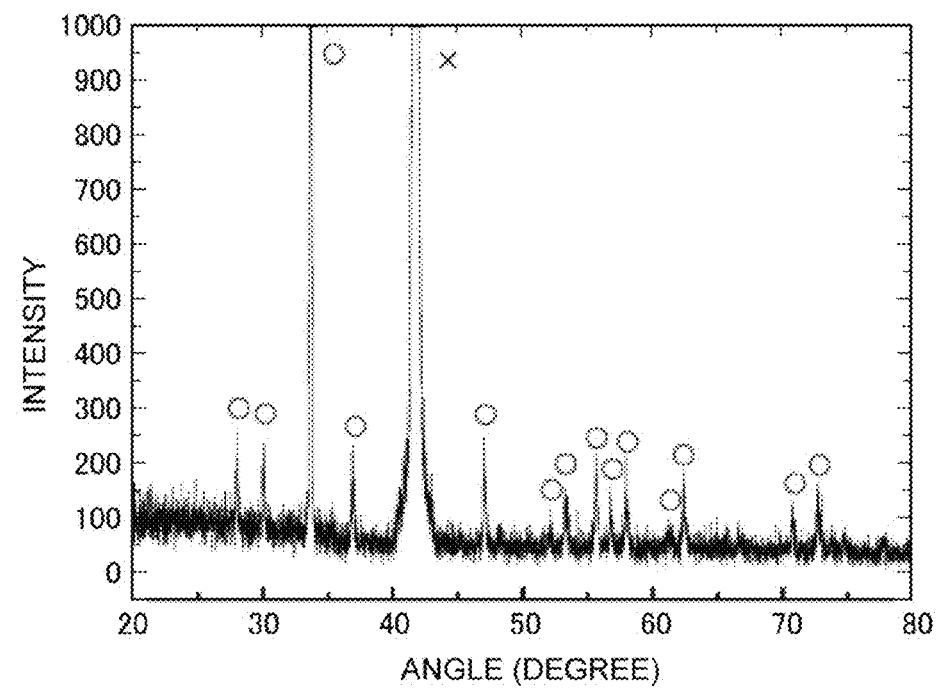

FIG. 5(a) is a graph illustrating the X-ray diffraction measurement result of the amorphous film before the heat treatment. FIG. 5(b) is a graph illustrating the X-ray diffraction measurement result of the film after heat treatment. As illustrated in these figures, before the heat treatment, only the diffraction line (indicated by a × mark in the figure) originating from the sapphire substrate was observed, whereas after the heat treatment, in addition to the above diffraction line, the diffraction lines (indicated by ○ marks in the figure) originating from the Pr:LuAG crystal were also observed. From these figures, it is understood that the amorphous film was changed to a Pr:LuAG polycrystal through heat treatment.

Figure 6:
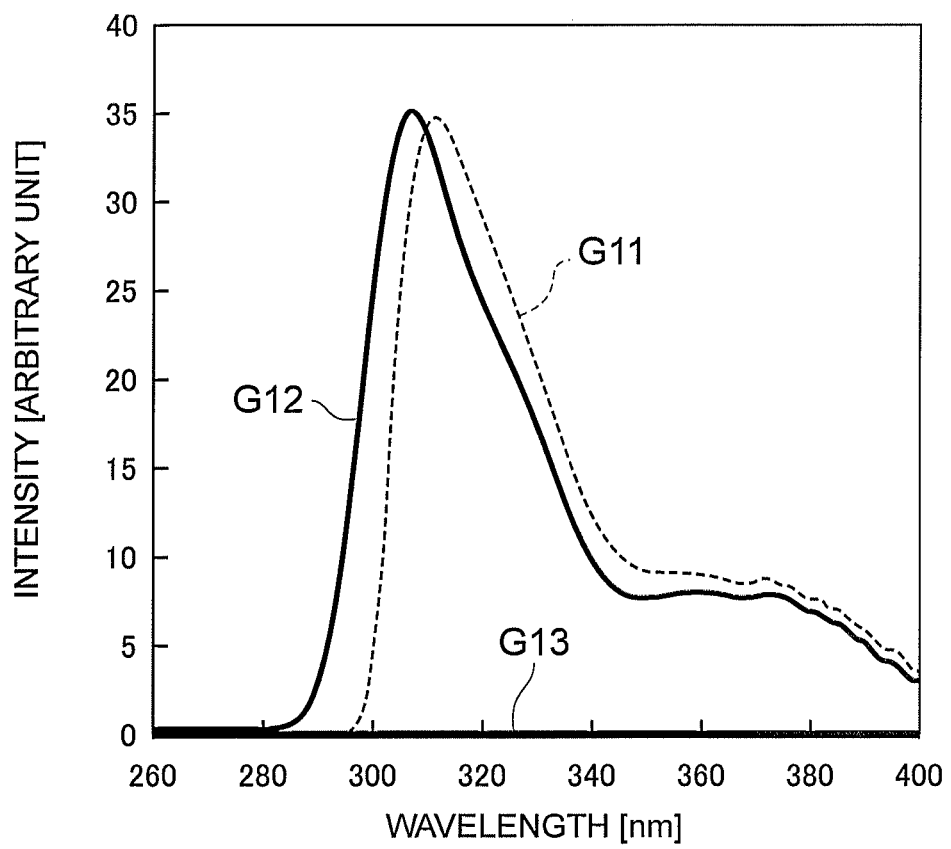
FIG. 6 is a graph illustrating a spectrum of ultraviolet light obtained by irradiating a Pr:LuAG film with an electron beam.

FIG. 6 is a graph illustrating the spectrum of ultraviolet light obtained by irradiating the Pr:LuAG film with an electron beam. In FIG. 6, a graph G11 shows the emission spectrum of the Pr:LuAG polycrystal, which is the deposition material (raw material for laser ablation), a graph G12 shows the emission spectrum of the Pr:LuAG film after the heat treatment, and a graph G13 shows the emission spectrum of the Pr:LuAG film before the heat treatment. Light was not emitted from the film before heat treatment. The accelerating voltage of the electron beam was set to 10 kV, the intensity of the electron beam (amount of electric current) was set to 100 μA, and the diameter of the electron beam was set to 2 mm. As can be seen from FIG. 6, in the amorphous film before heat treatment, ultraviolet light was hardly generated even upon irradiation with an electron beam. In contrast, in the polycrystalline Pr:LuAG film after heat treatment, the ultraviolet light was generated favorably upon irradiation with an electron beam.

Second Example

Next, a second example of the above-described embodiment will be described. In the present example, the temperature of the sapphire substrate during the formation of the Pr:LuAG film, which was set to 1000° C. in the first example, was set to 800° C. Furthermore, the heat treatment temperature that was set to 1400° C. in the first example was set to 1600° C. Other steps and conditions or the like are the same as those in the first embodiment.

Figure 7:
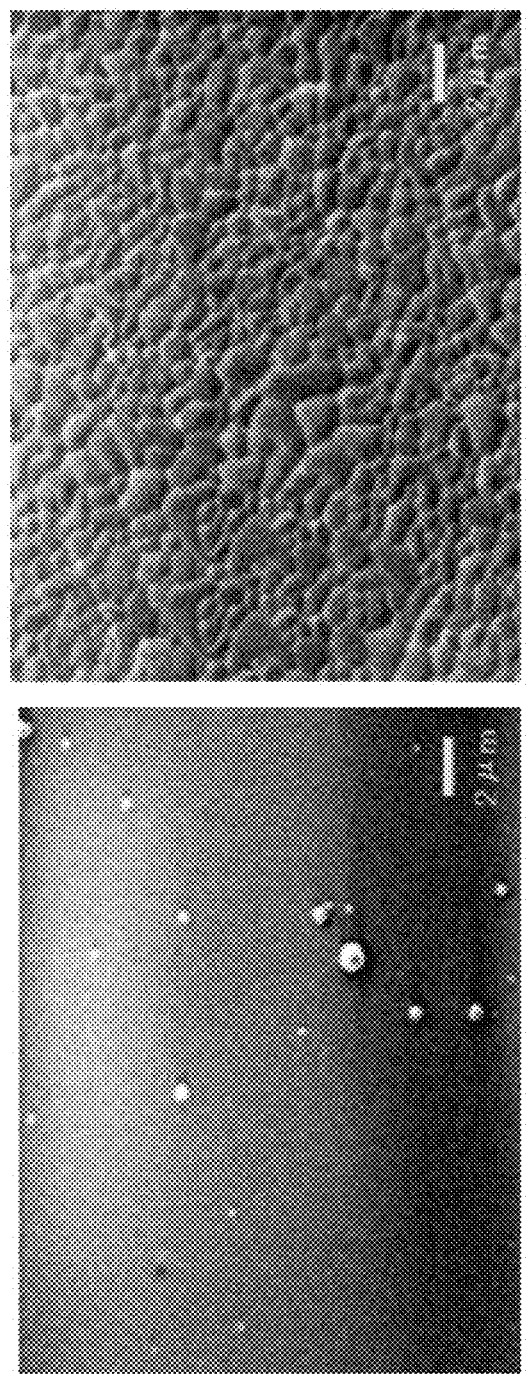
FIG. 7 is a pair of SEM photographs of a surface of the Pr:LuAG film.

According to the results of the X-ray diffraction measurement of the Pr:LuAG film formed by the present example, the diffraction lines originating from the Pr:LuAG crystal were observed in the same way as in FIG. 5(b). FIG. 7(a) and FIG. 7(b) are SEM photographs of a surface of the Pr:LuAG film before and after the heat treatment, respectively. With reference to FIG. 7(b), unlike FIG. 7(a), a region fragmented at about every few micrometers is observed. From the above facts, it is understood that the amorphous film was changed to a Pr:LuAG polycrystal through heat treatment. Also, when the Pr:LuAG polycrystalline film was irradiated with an electron beam, ultraviolet light having a spectrum of a peak wavelength that is the same as that in the graph G12 in FIG. 6 was obtained. It must be noted that, due to the fact that the peak intensity became larger than that in the graph G12 in FIG. 6, the luminous efficiency was higher than that of the first example.

Third Example

Next, a third example of the above-described embodiment will be described. In the present example, the ambient atmosphere during heat treatment, which was set to air in the second example, was set to a vacuum ($10^{-2}$ Pa). Other steps and conditions or the like are the same as those in the second example. According to the results of the X-ray diffraction measurement of the Pr:LuAG film formed by the present example, the diffraction lines originating from the Pr:LuAG crystal were observed in the same way as in FIG. 5(b).

Figure 8:
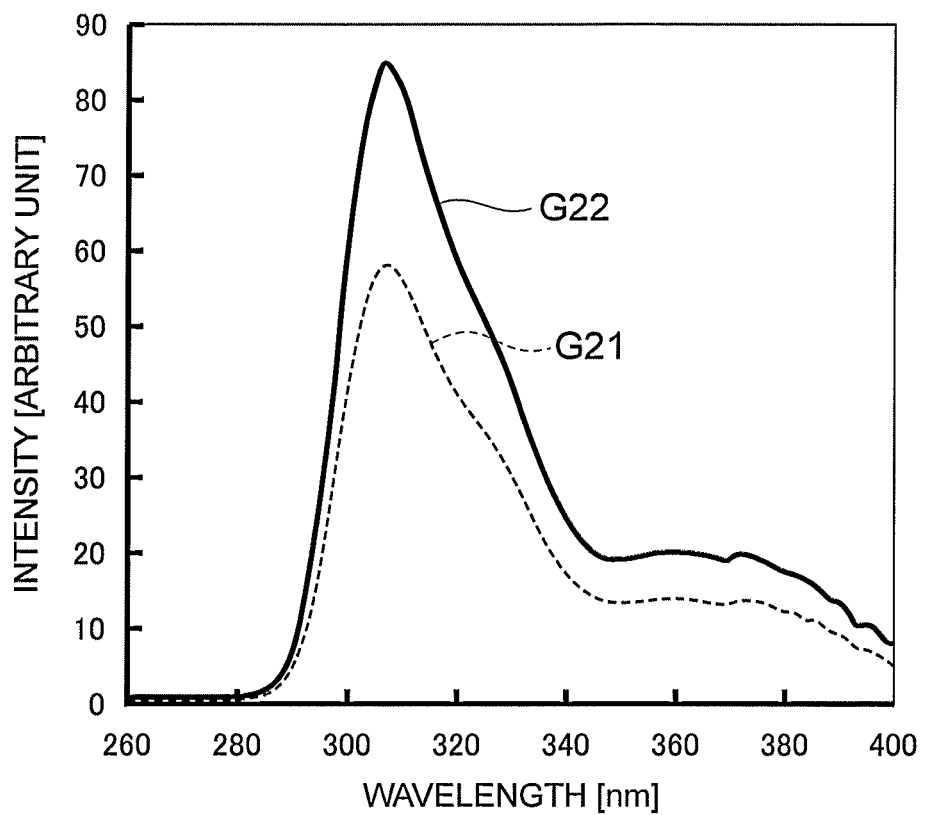
FIG. 8 is a graph illustrating a spectrum of ultraviolet light obtained by irradiating a Pr:LuAG film with an electron beam.

FIG. 8 is a graph illustrating the spectrum of ultraviolet light obtained by irradiating the Pr:LuAG film with an electron beam. In FIG. 8, a graph G21 shows the emission spectrum of the Pr:LuAG film formed by the second example (heat treatment in air) and a graph G22 shows the emission spectrum of the Pr:LuAG film formed by the present example (heat treatment in a vacuum). The accelerating voltage of the electron beam was set to 10 kV, the intensity of the electron beam (amount of electric current) was set to 100 μA, and the diameter of the electron beam was set to 2 mm. As can be seen from FIG. 8, as compared to the Pr:LuAG film that was heat-treated in the air, in the Pr:LuAG film that was heat-treated in a vacuum, the peak intensity of the ultraviolet light generated through irradiation with an electron beam becomes significantly higher (that is, the luminous efficiency becomes significantly higher).

Figure 9:
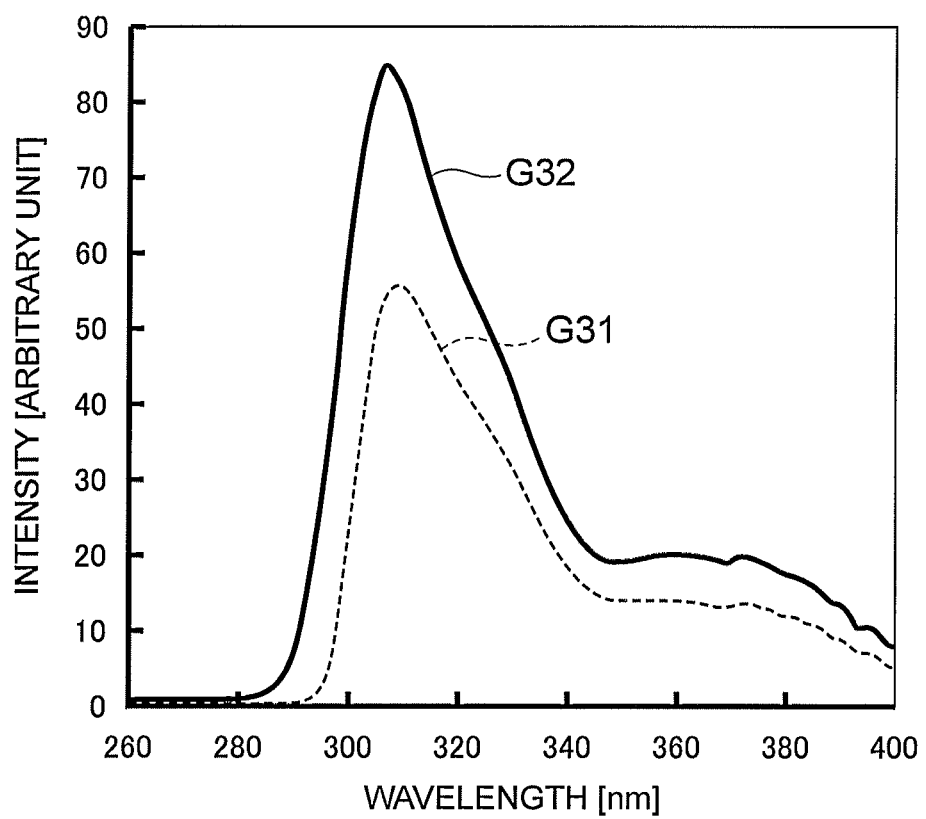
FIG. 9 is a graph illustrating a spectrum of ultraviolet light obtained by irradiating a Pr:LuAG single crystal substrate with an electron beam, as a comparative example.

FIG. 9 is a graph illustrating a spectrum of ultraviolet light obtained by irradiating a Pr:LuAG single crystal substrate with an electron beam under the same conditions as the present example, in the form of a comparative example. In FIG. 9, a graph G31 shows the emission spectrum for the Pr:LuAG single crystal substrate, and a graph G32 is the same as the graph G22 in FIG. 8. As can be seen from FIG. 9, as compared to the Pr:LuAG single crystal substrate, in the Pr:LuAG polycrystalline thin film, the peak intensity of the ultraviolet light generated upon irradiation with an electron beam becomes siginificantly higher (that is, the luminous efficiency becomes siginificantly higher).

Figure 10:
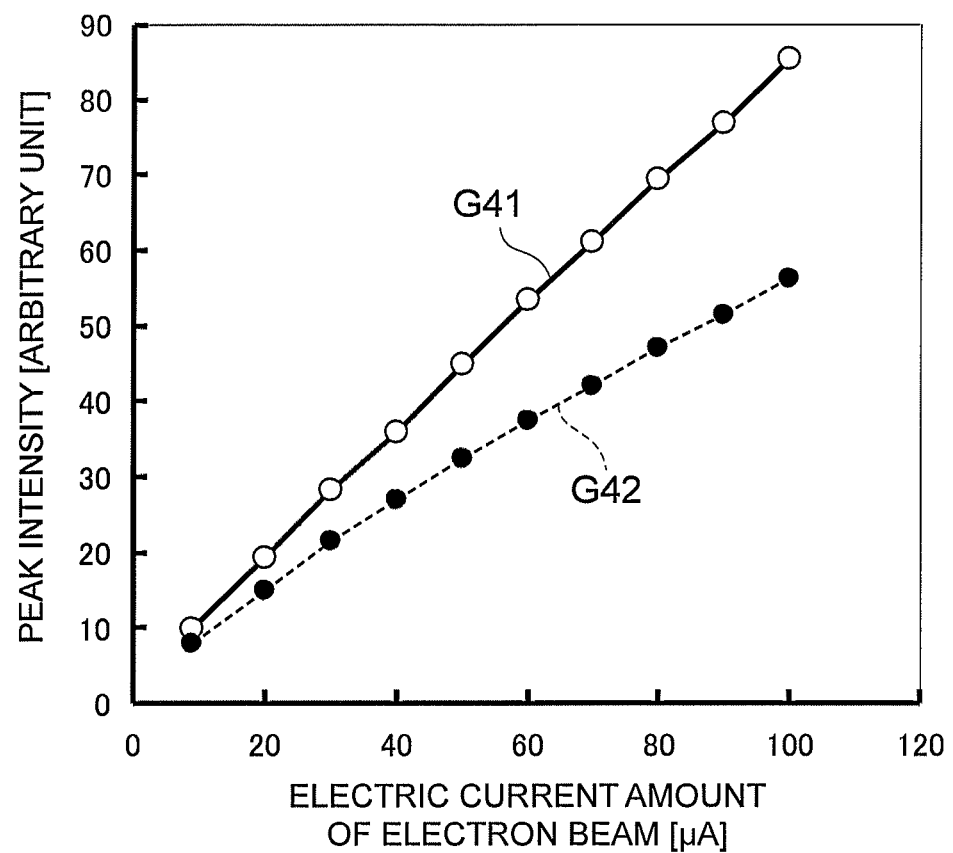
FIG. 10 is a graph illustrating a change in the peak intensity of the ultraviolet light when the intensity of an electron beam (amount of electric current) is changed.

FIG. 10 is a graph illustrating a change in the peak intensity of the ultraviolet light when the intensity of an electron beam (amount of electric current) is changed. In FIG. 10, the graph G41 shows the emission spectrum for the Pr:LuAG polycrystalline thin film formed by the present example, and the graph G42 shows the emission spectrum for the Pr:LuAG single crystal substrate according to the comparative example. As shown in FIG. 10, in the Pr:LuAG polycrystalline thin film formed by the present example, the intensity of the electron beam and the peak intensity of the ultraviolet light were found to have a very good proportional relationship (high linearity). Furthermore, in the Pr:LuAG polycrystalline thin film formed by the present example, it was found that regardless of the intensity of the electron beam, a peak intensity larger than the Pr:LuAG single crystal substrate could be achieved, and a decline in the luminous efficiency could be reduced even in the region where the electron beam was strong.

Fourth Example

Figure 11:
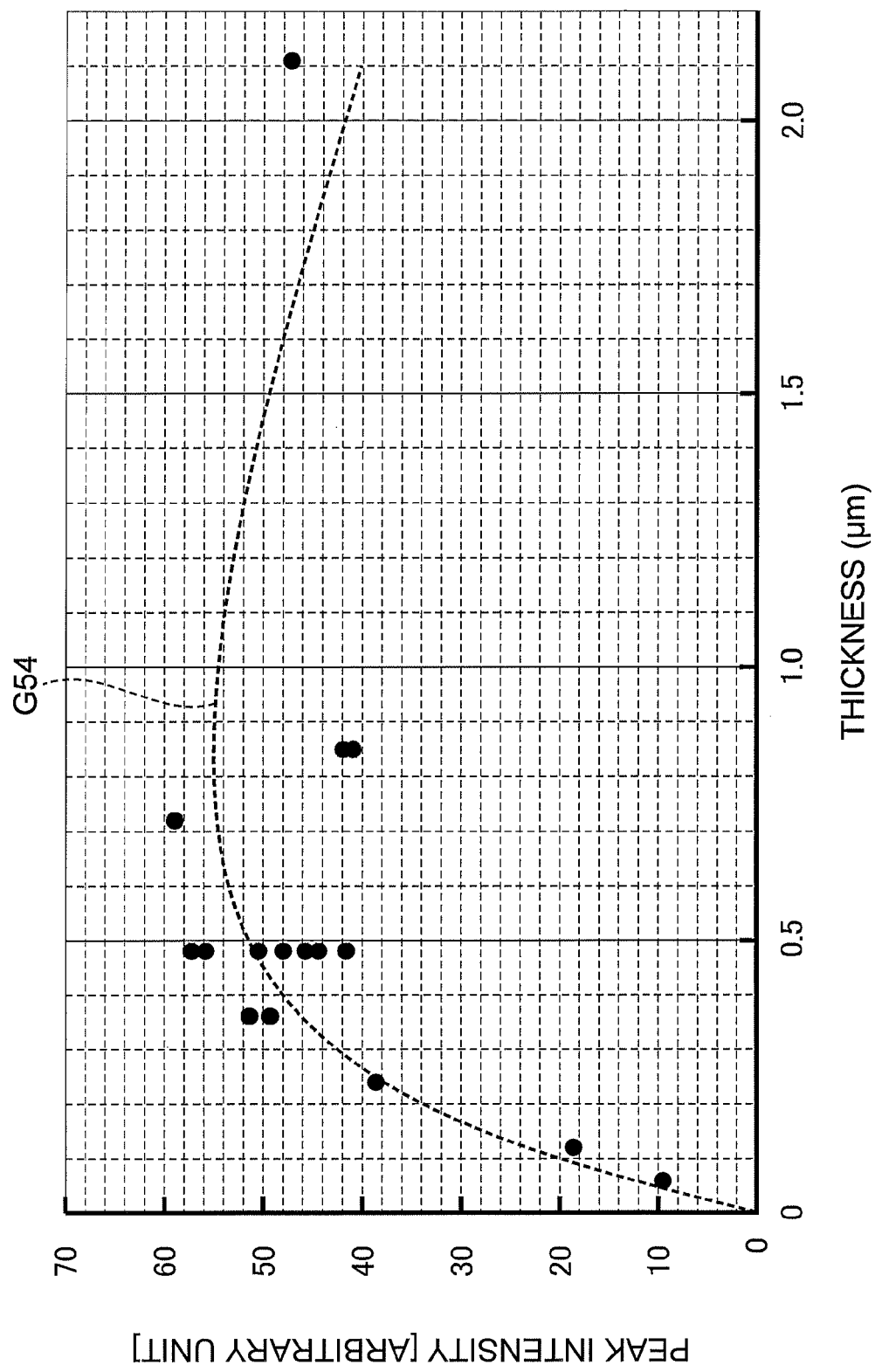
FIG. 11 is a graph illustrating a relationship between the thickness of the Pr:LuAG polycrystalline film and the peak intensity of the ultraviolet light.

The inventor performed an experiment regarding the relationship between the thickness of the Pr:LuAG polycrystalline film and the peak intensity of the ultraviolet light. That is, Pr:LuAG polycrystalline films were formed at various film-formation times, and after measuring the thickness of the films by using a step gauge, the peak intensity of the ultraviolet light generated upon irradiation with an electron beam was measured. FIG. 11 shows the above result in the form of a graph illustrating the relationship between the thickness of the Pr:LuAG polycrystalline film and the peak intensity of the ultraviolet light. In addition, a G54 curve in the figure is an approximated curve.

With reference to FIG. 11, if the thickness of the Pr:LuAG polycrystalline film falls below a certain value (approximately 500 nm), then the peak intensity of the ultraviolet light increases as the Pr:LuAG polycrystalline film thickens, and the luminous efficiency improves. However, if the thickness of the Pr:LuAG polycrystalline film exceeds this value, the peak intensity of the ultraviolet light either hardly increases or starts falling, in contrast. Also, it is understood from this graph that if the thickness of the Pr:LuAG polycrystalline film is 0.1 μm or more, a sufficiently practical ultraviolet light intensity (luminous efficiency) can be obtained.

Fifth Example

Figure 12:
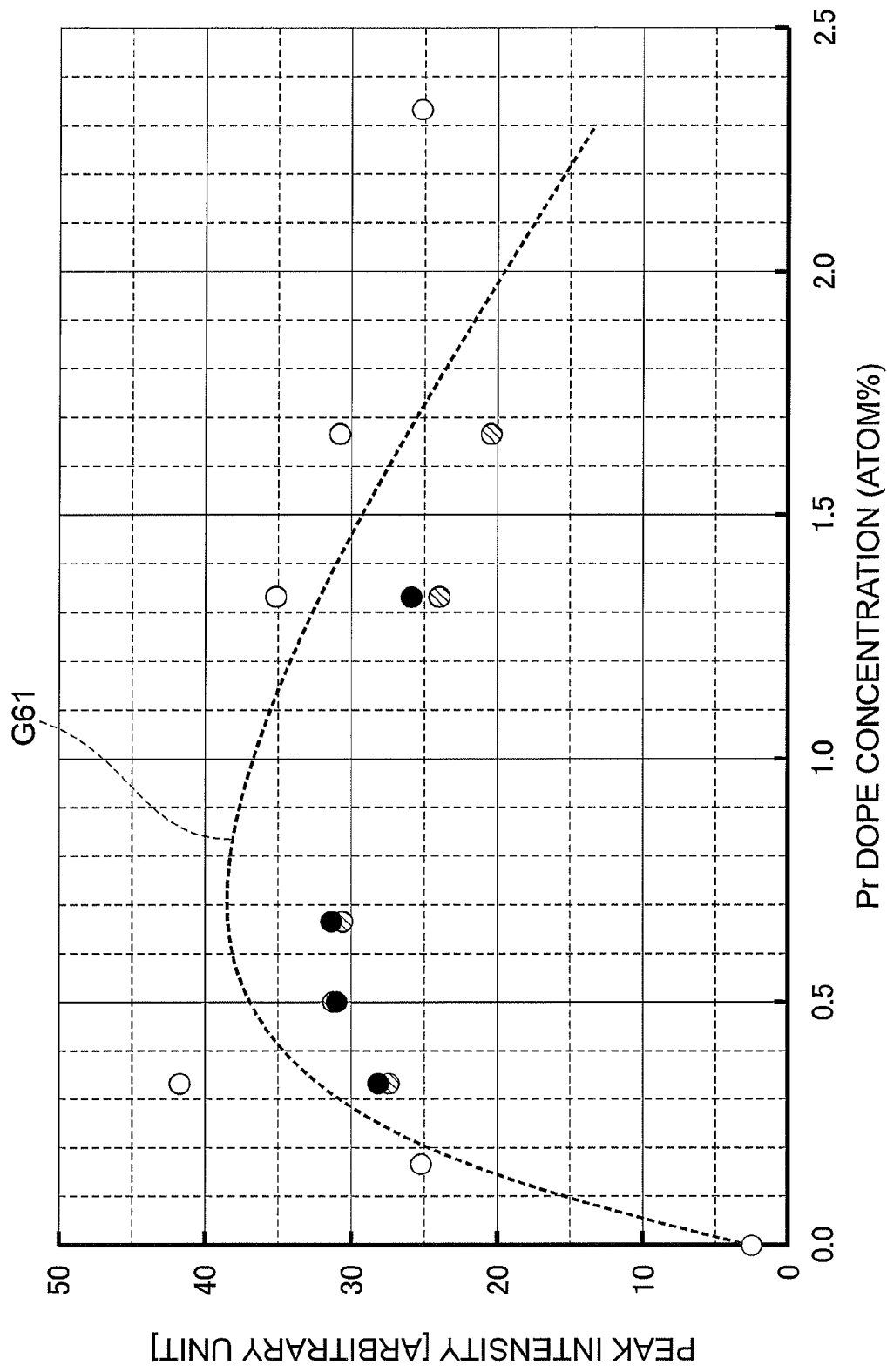
FIG. 12 is a graph illustrating a relationship between the Pr concentration of the Pr:LuAG-containing material and the peak intensity of the ultraviolet light.

The inventor performed an experiment regarding the relationship between the Pr concentration of the Pr:LuAG-containing material and the peak intensity of the ultraviolet light. That is, Pr:LuAG-containing materials having various Pr concentrations were prepared, Pr:LuAG polycrystalline films were formed using these materials, and the peak intensity of the ultraviolet light generated by irradiating the Pr:LuAG polycrystalline films with an electron beam was measured. In the present example, the heat treatment temperature was set to 1600° C. FIG. 12 shows the above result in the form of a graph illustrating the relationship between the Pr concentration of the Pr:LuAG-containing material and the peak intensity of the ultraviolet light. In addition, a G61 curve in the figure is an approximated curve.

With reference to FIG. 12, if the Pr concentration in a Pr:LuAG-containing material falls below a certain value (approximately 0.7 atom %), then the peak intensity of the ultraviolet light increases as the Pr concentration increases, and the luminous efficiency improves. However, if the Pr concentration of the Pr:LuAG-containing material exceeds this value, the peak intensity of the ultraviolet light starts falling, in contrast. Furthermore, from the graph, the Pr concentration of the Pr:LuAG-containing material is preferably 0.05 atom % or more and 2.0 atom % or less, and more preferably, 0.1 atom % or more and 1.0 atom % or less. Thus, it is understood that a sufficiently practical ultraviolet light intensity can be obtained.

The relationship between the Pr concentration of the Pr:LuAG-containing material and the peak intensity of the ultraviolet light was described above in the present example. It is assumed that the relationship between the Pr concentration of the Pr:LuAG polycrystalline film and the peak intensity of the ultraviolet light also has a similar trend as the graph shown in FIG. 11. It must be noted that the favorable range of the Pr concentration of the Pr:LuAG polycrystalline film is 0.001 atom % or more and 10 atom % or less, for example.

Sixth Example

Next, a sixth example of the above-described embodiment will be described. In the present example, six amorphous films were formed by depositing a material containing Pr:LuAG, and the amorphous films were then heat-treated in a vacuum at each of the temperatures of 1200° C., 1400° C., 1500° C., 1600° C., 1700° C., 1800° C. and 1900° C. to form Pr:LuAG polycrystalline films. Other steps and conditions or the like are the same as those in the second example. The Pr:LuAG polycrystalline films thus formed were irradiated with an electron beam (accelerating voltage of 10 kV, intensity of electron beam (amount of electric current) of 100 µA), and the spectrum of the ultraviolet light that was generated was measured.

Figure 13:
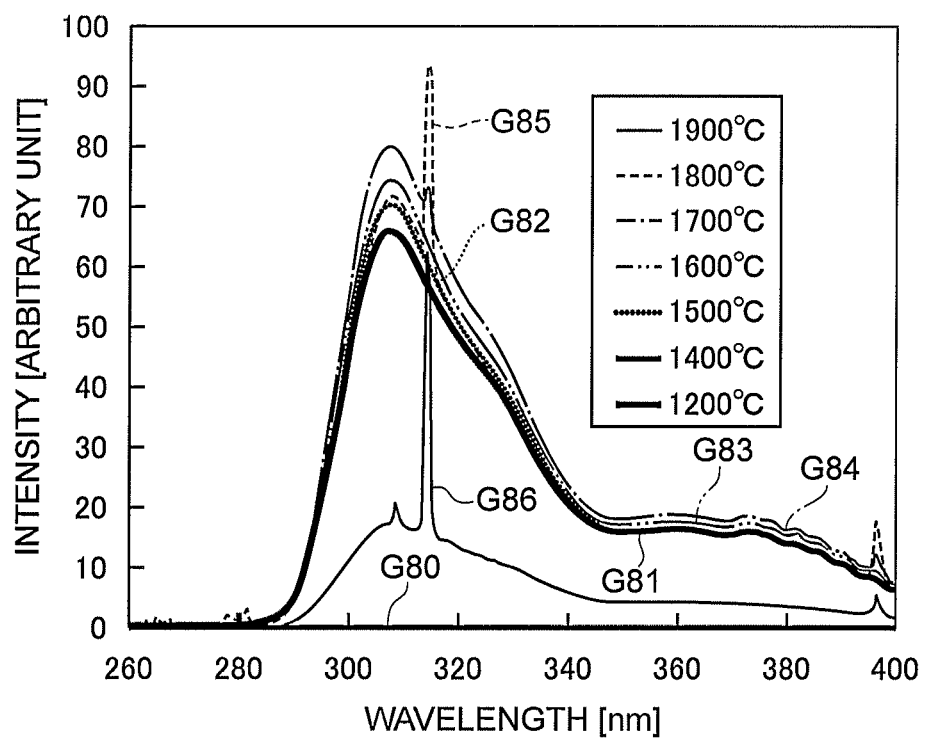
FIG. 13 is a graph illustrating a spectrum of ultraviolet light corresponding to various heat treatment temperatures.

FIG. 13 is a graph illustrating the measured spectrum. In FIG. 13, a graph G80 shows the case when the heat treatment temperature is 1200° C., a graph G81 shows the case when the heat treatment temperature is 1400° C., a graph G82 shows the case when the heat treatment temperature is 1500° C., a graph G83 shows the case when the heat treatment temperature is 1600° C., a graph G84 shows the case when the heat treatment temperature is 1700° C., a graph G85 shows the case when the heat treatment temperature is 1800° C., and a graph G86 shows the case when the heat treatment temperature is 1900° C. As shown in FIG. 13, it is found that the higher the heat treatment temperature of the Pr:LuAG film, the stronger the peak intensity of the ultraviolet light, and the higher the luminous efficiency. Furthermore, when the heat treatment temperature is very high, for example, at 1800° C. to 1900° C., a sharp emission peak waveform is found to appear in the spectrum. No light was emitted when the heat treatment temperature was set to 1200° C. It is preferable to set the heat treatment temperature between 1400° C. and 1800° C. when a wide wavelength range is used, and between 1800° C. and 1900° C. when an emission peak waveform is used.

Figure 14:
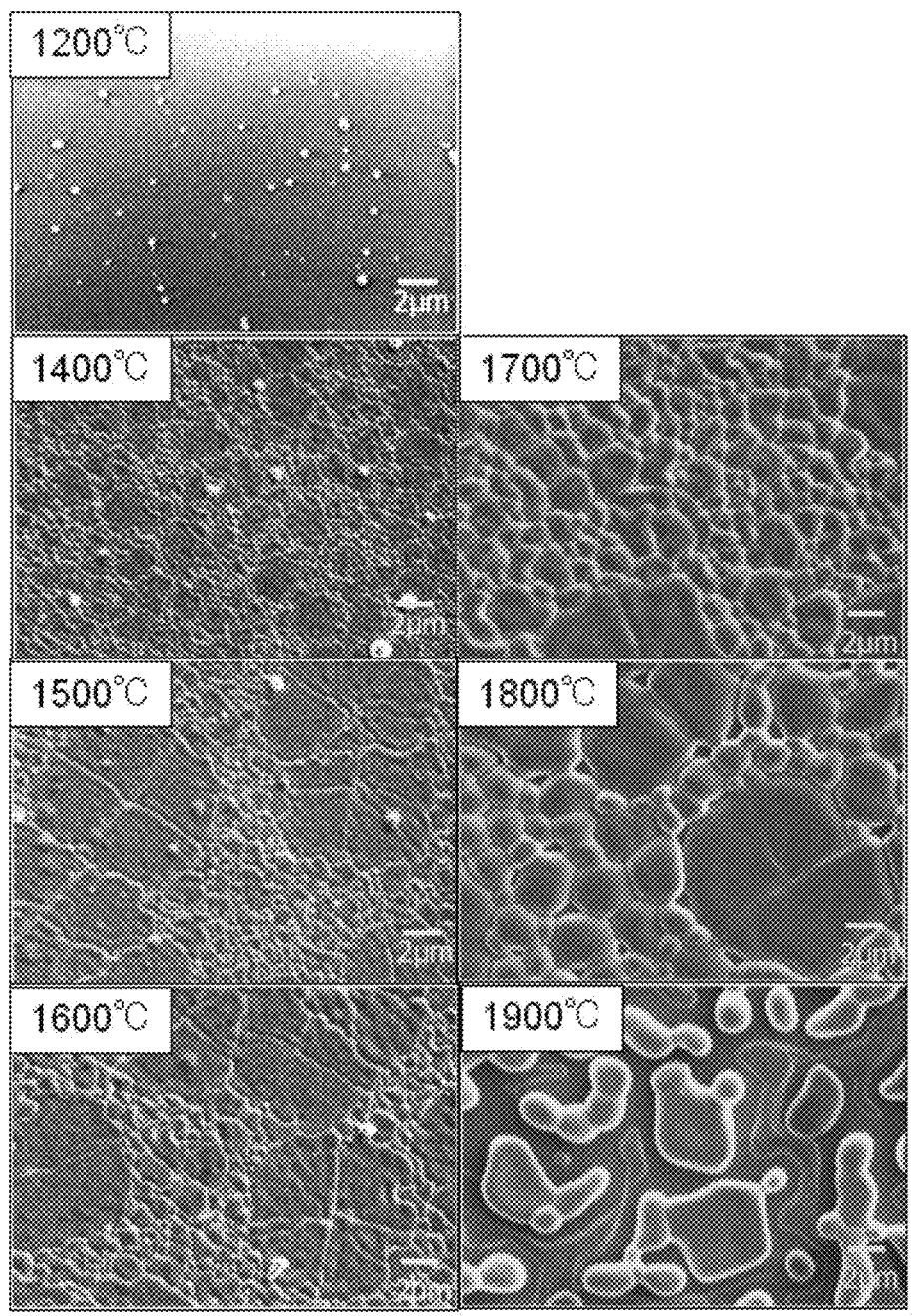
FIG. 14 is a SEM photograph of a surface of the Pr:LuAG polycrystalline film after heat treatment.

FIG. 14 is a SEM photograph of a surface of the Pr:LuAG polycrystalline film after heat treatment. FIG. 14 shows SEM photographs for each of the cases when the heat treatment temperature is set to 1200° C., 1400° C., 1500° C., 1600° C., 1700° C., 1800° C. and 1900° C. With reference to FIG. 14, it is understood that crystallization of Pr:LuAG advances as the heat treatment temperature rises. Furthermore, at 1200° C., the surface of the Pr:LuAG polycrystalline film was observed to be in almost the same state as the amorphous film before the heat treatment that is shown in FIG. 7(a).

Seventh Example

Next, a seventh example of the above-described embodiment will be described. In the present example, four amorphous films were formed by depositing a material containing Pr:LuAG, and the amorphous films were then heat-treated in a heat treatment furnace with ambient air at each of the heat treatment temperatures of 1200° C., 1400° C., 1600° C. and 1700° C. to form Pr:LuAG polycrystalline films. Other steps and conditions or the like are the same as those in the second example. The Pr:LuAG polycrystalline films thus formed were irradiated with an electron beam (accelerating voltage of 10 kV, intensity of electron beam (amount of electric current) of 100 µA), and the spectrum of the ultraviolet light that was generated was measured.

Figure 15:
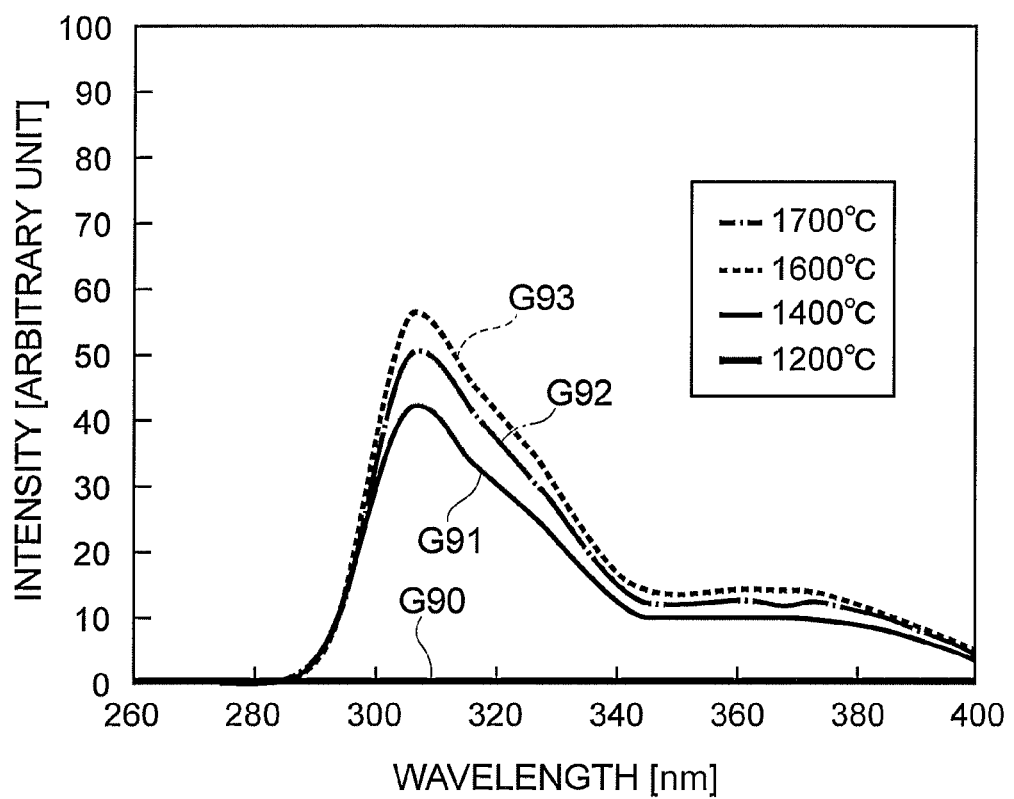
FIG. 15 is a graph illustrating a spectrum of ultraviolet light when heat treatment is performed in the ambient air.

FIG. 15 is a graph illustrating the measured spectrum. In FIG. 15, a graph G90 shows the case when the heat treatment temperature is 1200° C., a graph G91 shows the case when the heat treatment temperature is 1400° C., a graph G92 shows the case when the heat treatment temperature is 1700° C., and a graph G93 shows the case when the heat treatment temperature is 1600° C. As shown in FIG. 15, it is found that even when heat treatment is performed in air, the higher the heat treatment temperature, the stronger the peak intensity of the ultraviolet light, and the higher the luminous efficiency. It must be noted that the luminous efficiency was the highest when the heat treatment temperature was set to 1600° C. Even in this case, no light was emitted when the heat treatment temperature was set to 1200° C.

The peak intensity (310 nm) when the ambient atmosphere during heat treatment was at the atmospheric pressure was approximately 2/3 of the case when the ambient atmosphere during heat treatment was a vacuum. Heat treatment is preferably performed close to the atmospheric pressure or in an ambient atmosphere that is below the atmospheric pressure. An ambient atmosphere that is below the atmospheric pressure is more preferably a vacuum ($10^{-2}$ Pa or less). In both cases when the ambient atmosphere during heat treatment is close to the atmospheric pressure and when the ambient atmosphere is a vacuum, the heat treatment temperature is preferably 1400° C. or higher. Particularly, the heat treatment temperature is more preferably between 1400° C. and 1900° C.

The ultraviolet light generating target, the electron-beam-excited ultraviolet light source, and the method for producing the ultraviolet light generating target according to the present invention are not limited to the above-described embodiment, and various other modifications are possible. For example, in the embodiment and each of the examples described above, an amorphous film was formed through deposition by using a Pr:LuAG-containing material, and a Pr:LuAG polycrystalline film was obtained by heat-treating the film; however, the Pr:LuAG polycrystalline film may be produced according to another production method, not limited to this production method.

INDUSTRIAL APPLICABILITY

The present invention can be used as an ultraviolet light generating target, an electron-beam-excited ultraviolet light source, and a method for producing the ultraviolet light generating target, with which it is possible to improve the ultraviolet light generating efficiency.

REFERENCE SIGNS LIST

10 . . . Electron-beam-excited ultraviolet light source, 11 . . . Container, 12 . . . Electron source, 13 . . . Extraction electrode, 16 . . . Power supply unit, 20 . . . Ultraviolet light generating target, 21 . . . Substrate, 21a . . . Main surface, 21b . . . Back surface, 22 . . . Pr:LuAG polycrystalline film, 23 . . . Aluminum film, 50 . . . Laser ablation apparatus, 51 . . . Vacuum container, 52 . . . Sample loading table, 53 . . . Pr:LuAG-containing material, 54 . . . Laser inlet, 55 . . . Rotating holder, 56 . . . Heater, 57 . . . Gas inlet, B . . . Laser beam, EB . . . Electron beam, UV . . . Ultraviolet light.

The invention claimed is:

1. An ultraviolet light generating target, comprising:
   a substrate compring sapphire, quartz or rock crystal; and
   a Pr:LuAG polycrystalline film provided on the substrate and generating ultraviolet light upon receiving an electron beam.

2. The ultraviolet light generating target according to claim 1, wherein a thickness of the Pr:LuAG polycrystalline film is 0.1 µm or more and 10 µm or less.

3. An electron-beam-excited ultraviolet light source, comprising:
   the ultraviolet light generating target according to claim 1; and
   an electron source providing the electron beam to the ultraviolet light generating target.

4. A method for producing an ultraviolet light generating target, comprising:

a first step of depositing a Pr:LuAG film on a substrate comprising sapphire, quartz or rock crystal; and a second step of performing polycrystallization through a heat treatment of the Pr:LuAG film.

5. The method for producing the ultraviolet light generating target according to claim 4, wherein a thickness of the Pr:LuAG film after heat treatment in the second step is 0.1 µm or more and 10 µm or less.

6. The method for producing the ultraviolet light generating target according to claim 4, wherein the surrounding of the Pr:LuAG film is a vacuum during the heat treatment in the second step.

\* \* \* \* \*